United States Patent
He

(10) Patent No.: US 7,561,444 B2
(45) Date of Patent: Jul. 14, 2009

(54) MOUNTING ASSEMBLY FOR SHIELDING APPARATUS

(75) Inventor: Yu-Wei He, Shenzhen (CN)

(73) Assignees: Hong Fu Jin Precision Industry (ShenZhen) Co., Ltd., Shenzhen City, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 48 days.

(21) Appl. No.: 11/863,275

(22) Filed: Sep. 28, 2007

(65) Prior Publication Data

US 2009/0068885 A1    Mar. 12, 2009

(30) Foreign Application Priority Data

Sep. 7, 2007    (CN) .................. 2007 2 0200985 U

(51) Int. Cl.
*H05K 9/00*    (2006.01)
(52) U.S. Cl. .................. 361/818; 361/800; 361/816; 361/799; 361/753; 439/607; 439/609; 174/350; 174/385; 174/377; 174/371
(58) Field of Classification Search .................. 361/753, 361/799, 800, 816, 818; 439/607, 609; 174/350, 174/351, 362, 377, 385
See application file for complete search history.

(56) References Cited

U.S. PATENT DOCUMENTS 6,292,373 B1 * 9/2001 Li et al. ...................... 361/800
6,320,121 B1 * 11/2001 Honeycutt et al. .......... 174/384
6,359,768 B1 * 3/2002 Eversley et al. ............. 361/212
6,542,383 B1 * 4/2003 Tsuyuki et al. ............. 361/816
6,590,848 B1 * 7/2003 Chen .......................... 720/654
6,603,657 B2 * 8/2003 Tanzer et al. ................ 361/685
6,654,256 B2 * 11/2003 Gough ........................ 361/816
6,940,731 B2 * 9/2005 Davis et al. ................. 361/801
7,327,585 B1 * 2/2008 Fan et al. .................... 361/816
7,338,140 B1 * 3/2008 Huang et al. ............. 312/223.2
7,357,675 B2 * 4/2008 Barringer et al. ............ 439/609
7,447,016 B2 * 11/2008 Tsai et al. ................... 361/685
7,473,139 B2 * 1/2009 Barringer et al. ............ 439/609

* cited by examiner

*Primary Examiner*—Dameon E Levi
(74) *Attorney, Agent, or Firm*—Frank R. Niranjan

(57) ABSTRACT

A mounting assembly for shielding EMI, the mounting assembly includes a drive bracket (10) and a shielding apparatus (30). The drive bracket includes a bottom wall (11), a first retaining wall (16), a second retaining wall (18), and a dividing wall (15), the first retaining wall defines a first hole (161), the second retaining wall defines a second hole (181), the dividing wall defines an upper hole (153) and a lower hole (151). The shielding apparatus includes a shielding cover (31) and a bezel (33), the shielding cover has a first flange (36) and a second flange (38), the first flange has a protuberance (361) engaged in the first hole, the second flange has a protuberance (381) engaged in the lower hole, the second shielding apparatus (40) engaged in the upper hole of the dividing wall and the second hole of the second retaining wall.

15 Claims, 4 Drawing Sheets

MOUNTING ASSEMBLY FOR SHIELDING APPARATUS

BACKGROUND

1. Field of the Invention

The present invention relates to mounting assembly for shielding apparatuses, and more particularly to a mounting assembly for shielding apparatus of a data storage device.

2. Description of Related Art

In a computer or a server, a disk drive, such as a hard disk drive, and/or a shielding apparatus is usually provided. In order to secure the disk drive or the shielding apparatus to the disk drive or the server, a mounting assembly is needed.

For example, a mounting assembly includes a drive bracket, a tray for receiving the shielding apparatus, and a securing structure installed thereon for securing the tray in the drive bracket. In assembly, the shielding apparatus is firstly received in the tray. Then the shielding apparatus and the tray are together inserted into the drive bracket, and then secured in the drive bracket by operating the securing structure. In removal, the securing structure is operated to release the tray from the drive bracket. The tray and the shielding apparatus are thereby drawn out from the drive bracket. The shielding apparatus can be thus removed from the tray. Which altogether is a complicated laborious operation.

What is needed, therefore, is a mounting assembly for conveniently replacing or maintaining a shielding apparatus in a disk drive or a server.

SUMMARY

A mounting assembly for shielding EMI, the mounting assembly includes a drive bracket and a shielding apparatus. The drive bracket includes a bottom wall, a first retaining wall, a second retaining wall, and a dividing wall between the first retaining wall and the second retaining wall. The first retaining wall defines a first hole, the second retaining wall defines a second hole. The dividing wall defines an upper hole and a lower hole, which is the same size as the upper hole. The distance between the upper hole and the bottom wall is substantially equal to the distance between the first hole and the bottom wall, the distance between the lower hole and the bottom wall is substantially equal to the distance between the second hole and the bottom wall, and the lower hole is below the upper hole. The shielding apparatus is received in the drive bracket, and includes a shielding cover and a bezel mounted on a front side of the shielding cover. The shielding cover has a first flange and a second flange respectively extending from two opposite side edges thereof. The first flange has a protuberance engaged in the first hole of the first retaining wall, and the second flange has a protuberance engaged in the lower hole of the dividing wall.

Other advantages and novel features of the present invention will become more apparent from the following detailed description of a preferred embodiment when taken in conjunction with the accompanying drawings, in which:

DETAILED DESCRIPTION

Figure 1:
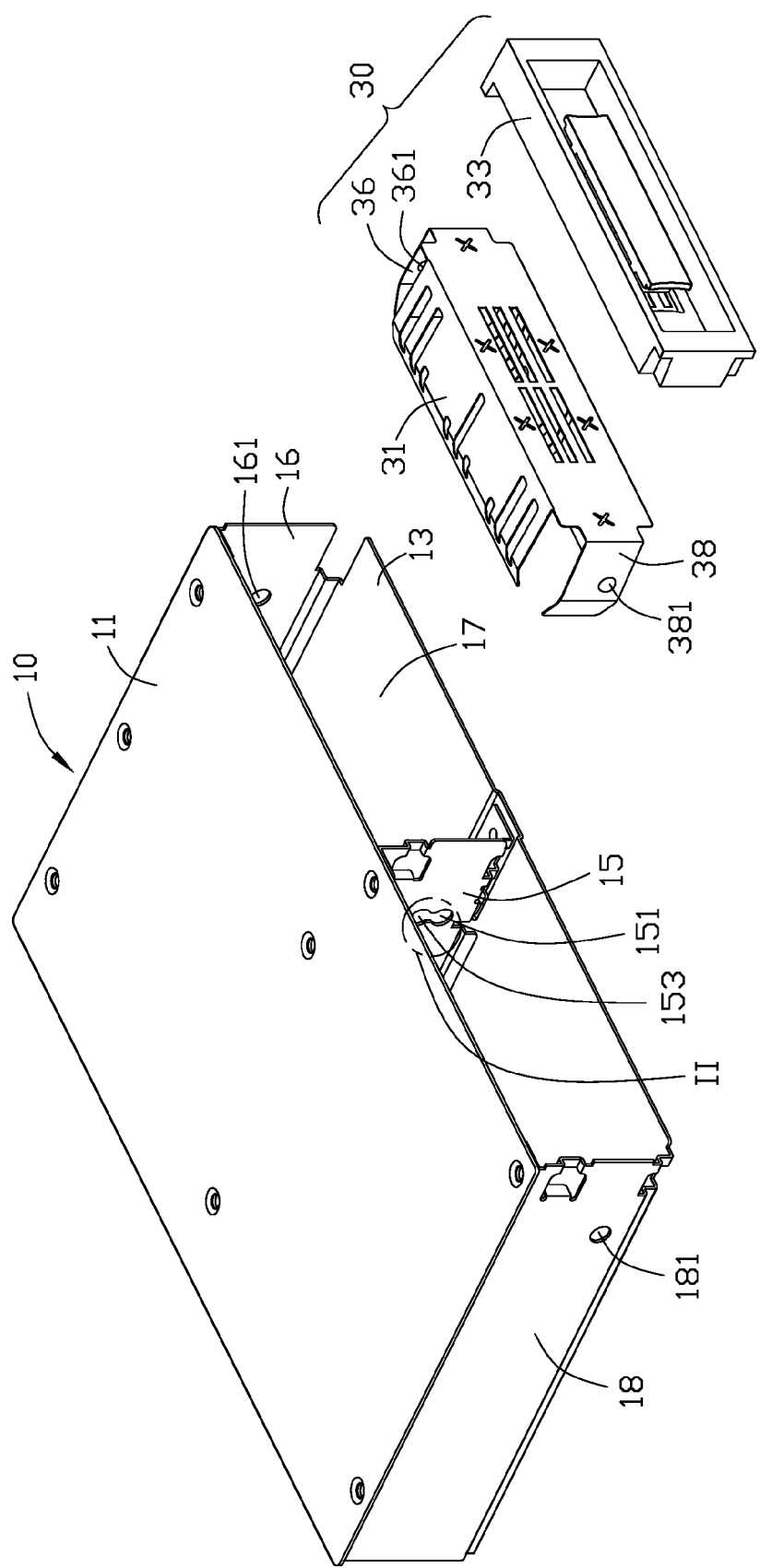
FIG. 1 is exploded, isometric view of a mounting assembly for shielding apparatus according to a preferred embodiment of the present invention, the mounting assembly for shielding apparatus including a drive bracket and an EMI shielding apparatus.

Referring to FIG. 1, a mounting assembly for a shielding apparatus 30 in accordance with a preferred embodiment of the present invention includes the shielding apparatus 30 which is for shielding EMI (Electro Magnetic Interference), and a drive bracket 10 configured for receiving the shielding apparatus 30.

Figure 2:
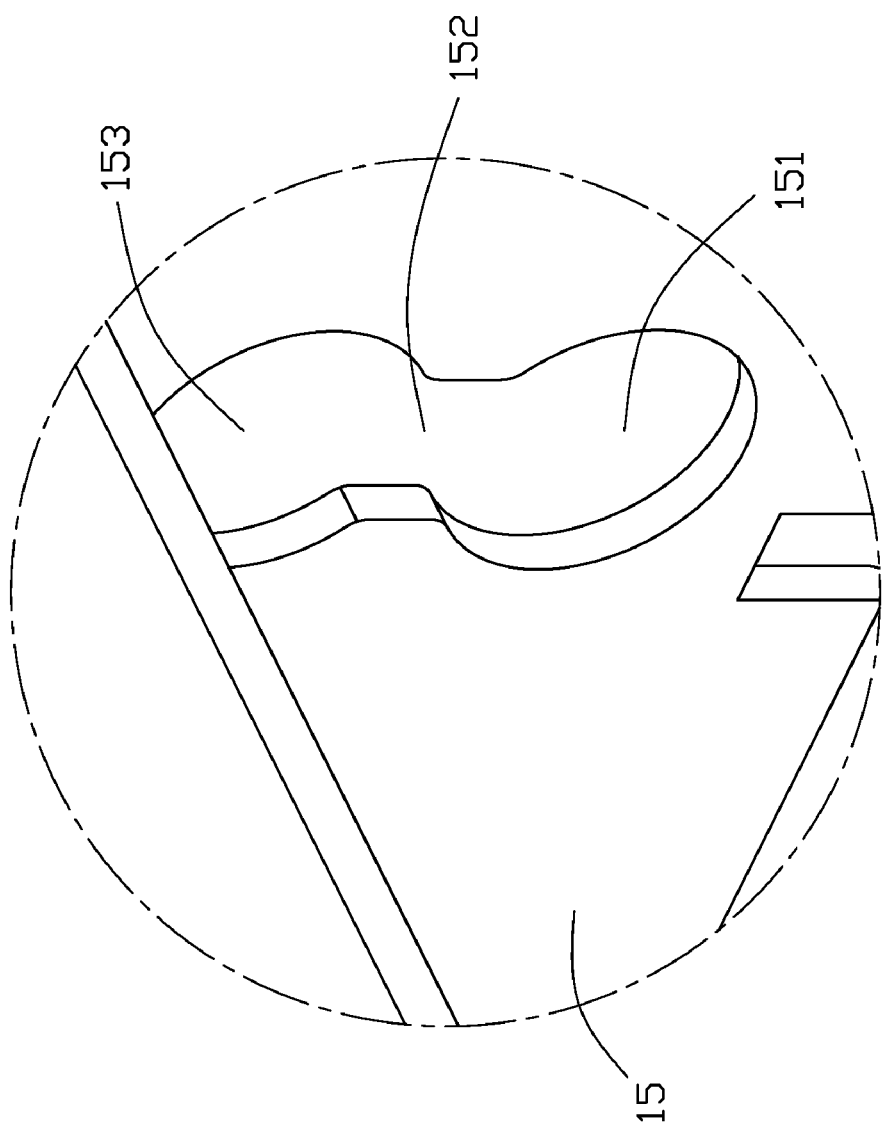
FIG. 2 is an enlarged view of encircled portion II of FIG. 1.

The shielding apparatus 30 includes a shielding cover 31 and a bezel 33 which is mounted on a front side of the shielding cover 31. A first flange 36 and a second flange 38 are respectively perpendicularly extending from two opposite side edges of the shielding cover 31. The drive bracket 10 includes a bottom wall 13, a dividing wall 15, a first retaining wall 16, and a second retaining wall 18 perpendicularly extending up from the bottom wall 13, and a top wall 11 covering the first retaining wall 16, the second retaining wall 18, and the dividing wall 15. The bottom wall 13, the first retaining wall 16, the second retaining wall 18, and the top wall 11 cooperatively enclose a casing space. The casing space is divided into two receiving spaces 17 for installing two shielding apparatuses. The first retaining wall 16 defines a first hole 161, and the second retaining wall 18 defines a second hole 181. The dividing wall 15 defines a fixing hole, which has an upper hole 153 and a lower hole 151 the same size as the upper hole 153. The distance between the upper hole 153 and the bottom wall 13 is substantially equal to the distance between the first hole 161 and the bottom wall 13. The distance between the lower hole 151 and the bottom wall 13 is substantially equal to the distance between the second hole 181 and the bottom wall 13. The lower hole 151 is below the upper hole 153 and communicates with the upper hole 153 via a narrower connecting slot 152 (see FIG. 2). A size of the first hole 161 of the first flange 16 is substantially equal to that of the upper hole 153 of the dividing wall 15. A line connecting the center of the upper hole 153 and the center of the lower hole 151 is perpendicular to the top wall 11. The first flange 36 of the shielding cover 31 defines a protuberance 361, which is engagable in the first hole 161 of the first retaining wall 16. The second flange 38 of the shielding cover 31 defines a protuberance 381, which is engagable in the lower hole 151 of the dividing wall 15. The mounting assembly can advantageously further include a second shielding apparatus 40, same as the shielding apparatus 30 (referring to FIG. 4). The second shielding apparatus 40 engages in the upper hole 153 of the dividing wall 15 and the second hole 181 of the second retaining wall 18.

Figure 3:
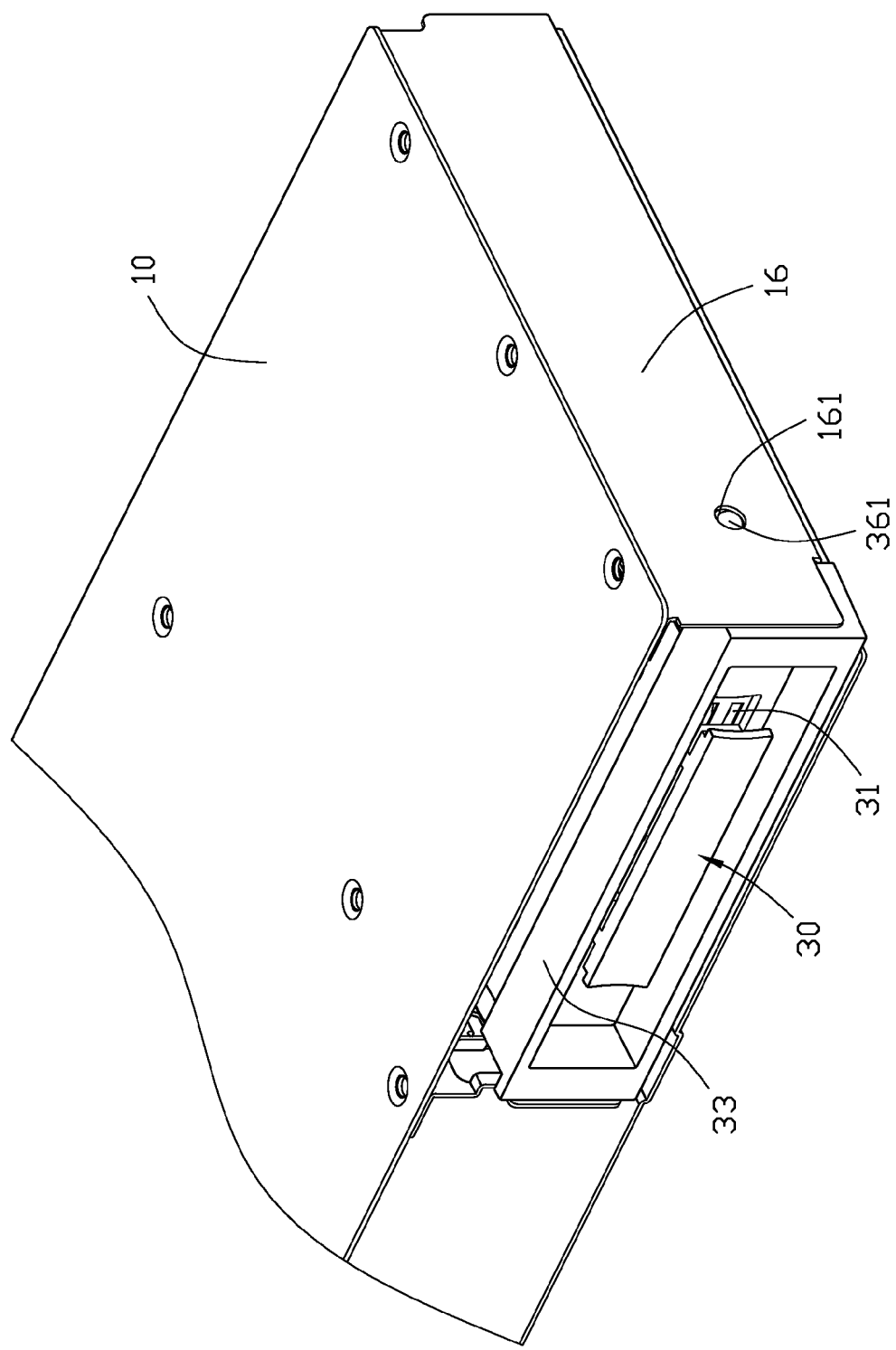
FIG. 3 is an assembled view of FIG. 1.
Figure 4:
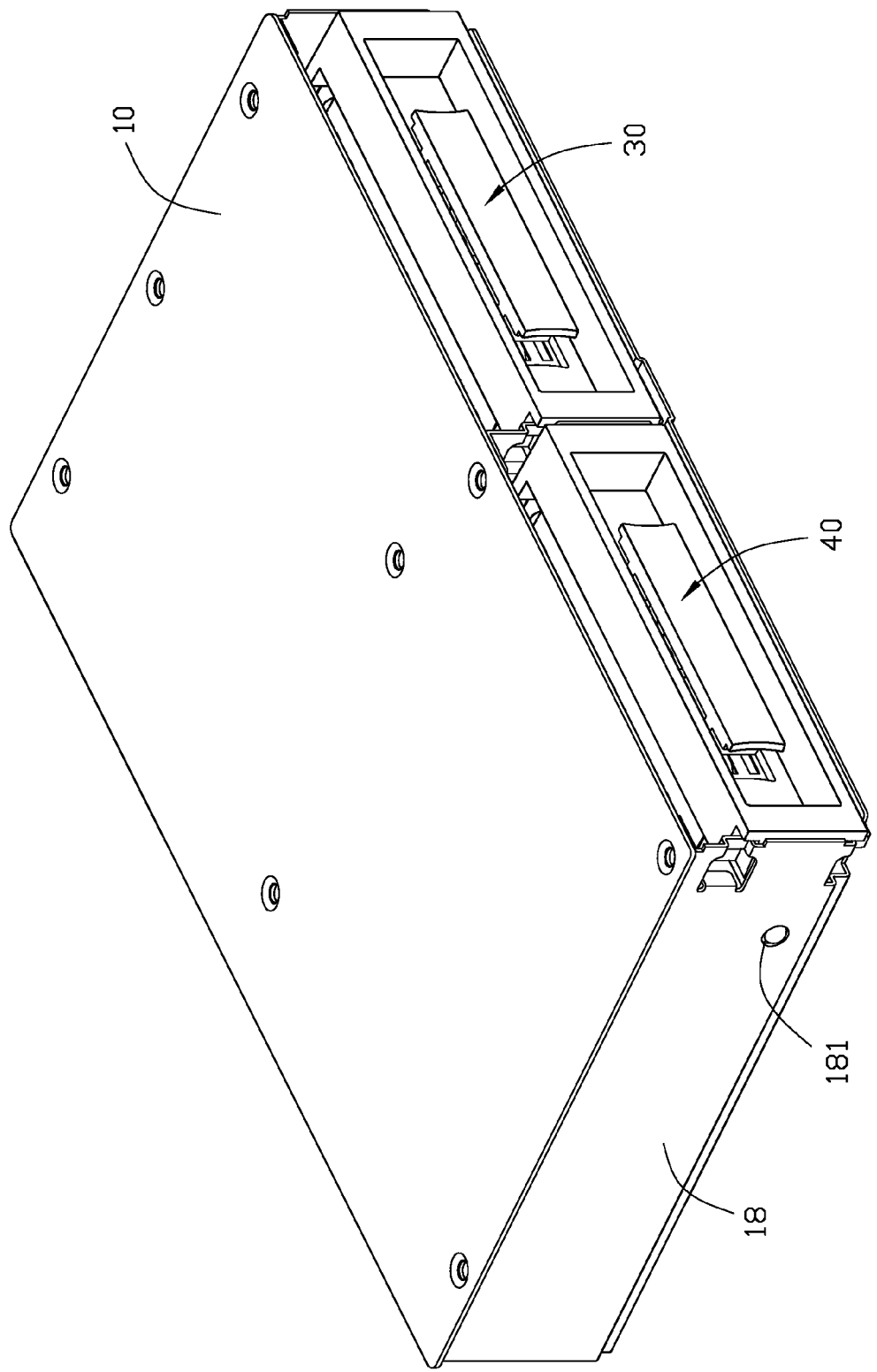
FIG. 4 is another assembled view of FIG. 3.

Referring to FIG. 3 and FIG. 4, when assembling the shielding apparatus 30, the bezel 33 is mounted on the front end of the shielding cover 31 to form the shielding apparatus 30. The shielding cover 31 faces the receiving space 17. The shielding apparatus 30 is moved towards the drive bracket 10. The first flange 36 and the second flange 38 respectively abut against the first retaining wall 16 and the dividing wall 15 causing the first flange 36 and the second flange 38 to deform inwardly until the protuberance 361 of the first flange 36 and the protuberance 381 of the second flange 38 engage in the first hole 161 and the lower hole 151 respectively, at which point the first flange 36 and the second flange 38 rebound and clamps therein. Thus the shielding apparatus 30 is received in the receiving space 17 and securely mounted to the drive bracket 10, and the same steps are repeated for optionally installing the remaining second shielding apparatus 40. When replacing one of the shielding apparatuses, the shielding apparatus 30 can be removed by pulling the bezel 33.

It is to be understood, however, that even though numerous characteristics and advantages of the present invention have been set fourth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting assembly for shielding EMI, the mounting assembly comprising:

a drive bracket comprising a bottom wall, a first retaining wall, a second retaining wall, and a dividing wall between the first retaining wall and the second retaining wall, the first retaining wall defining a first hole, the second retaining wall defining a second hole, the dividing wall defining an upper hole and a lower hole having the same size as the upper hole, the distance between the upper hole and the bottom wall being substantially equal to the distance between the first hole and the bottom wall, the distance between the lower hole and the bottom wall being substantially equal to the distance between the second hole and the bottom wall, and the lower hole being below the upper hole; and a first and a second shielding apparatus received in the drive bracket, the first and second shielding apparatuses each comprising an EMI shielding cover and a bezel mounted on a front side of the shielding cover, the shielding cover having a first flange and a second flange respectively extending from two opposite ends thereof, the first flange of the first shielding apparatus having a protuberance engaged in the first hole of the first retaining wall, the second flange of the first shielding apparatus having a protuberance engaged in the lower hole of the dividing wall, the second shielding apparatus engaged in the upper hole of the dividing wall and the second hole of the second retaining wall.

2. The mounting assembly as described in claim 1, wherein the drive bracket includes a top wall; the bottom wall, the top wall, the first retaining wall, the second retaining wall, and the dividing wall cooperatively enclosing two receiving spaces for installing two shielding apparatuses.

3. The mounting assembly as described in claim 2, wherein a line passing through the center of the upper hole and the center of the lower hole is perpendicular to the top wall.

4. The mounting assembly as described in claim 1, wherein the dividing wall has a connecting slot which communicates the upper hole with the lower hole, the upper hole, the connecting slot and the lower hole cooperatively forming a "8"-shaped fixing hole.

5. The mounting assembly as described in claim 4, wherein the diameter of the upper hole is greater than the width of the connecting slot.

6. The mounting assembly as described in claim 1, wherein the size of the first hole of the first retaining wall is substantially equal to that of the upper hole of the dividing wall.

7. A mounting assembly for shielding EMI, the mounting assembly comprising:

a drive bracket comprising a bottom wall, a first retaining wall, a second retaining wall, and a dividing wall between the first retaining wall and the second retaining wall, the first retaining wall defining a first hole, the second retaining wall defining a second hole, the dividing wall defining an upper hole and a lower hole which has a same size as the upper hole, a distance between the upper hole to the bottom wall being substantially equal to a distance between the first hole to the bottom wall, a distance between the lower hole to the bottom wall being substantially equal to a distance between the second hole to the bottom wall, and the lower hole being under the upper hole; and a shielding apparatus comprising:

an EMI shielding cover having a first flange and an opposite second flange, the first flange and the second flange respectively having a protuberance coupled to the first hole and the lower hole; and a bezel mounted on a front side of the shielding cover.

8. The mounting assembly as described in claim 7, wherein the drive bracket includes a top wall, the bottom wall, the top wall, the first retaining wall, the second retaining wall, and the dividing wall cooperatively enclosing two receiving space for installing two shielding apparatuses.

9. The mounting assembly as described in claim 8, wherein a line passes through a center of the upper hole and a center of the lower hole is perpendicular to the top wall.

10. The mounting assembly as described in claim 7, wherein the dividing wall further has a connecting slot which communicates the upper hole to the lower hole, the upper hole, the connecting slot and the lower hole cooperatively forming a "8"-shaped fixing hole.

11. The mounting assembly as described in claim 10, wherein the size of the upper hole is greater than a width of the connecting slot in cross section.

12. The mounting assembly as described in claim 7, wherein a size of the first hole of the first flange is substantially equal to that of the upper hole of the dividing wall.

13. The mounting assembly as described in claim 7, wherein the mounting assembly further includes a second shielding apparatus which is the same as the shielding apparatus, the second shielding apparatus engaged in the upper hole of the dividing wall and the second hole of the second retaining wall.

14. The mounting assembly as described in claim 7, wherein the first flange and the second flange respectively perpendicularly extending from two opposite ends of the shielding cover.

15. The mounting assembly as described in claim 7, wherein the bezel is exposed outside the drive bracket, the protuberances of the EMI shielding cover being disengageable from the first hole and the lower hole by manual movement of the bezel away from the drive bracket.

* * * * *